US011977819B2

(12) United States Patent
Pu et al.

(10) Patent No.: US 11,977,819 B2
(45) Date of Patent: May 7, 2024

(54) METHOD OF SOIL COVER LAYER OF SOLID WASTE LANDFILL CONSIDERING EFFECT OF PLANT ROOT

(71) Applicant: Huazhong University of Science and Technology, Wuhan (CN)

(72) Inventors: Hefu Pu, Wuhan (CN); Ming Min, Wuhan (CN); Yu Miao, Wuhan (CN); Junjie Zheng, Wuhan (CN); Xiaojun Wen, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/178,901

(22) Filed: Mar. 6, 2023

(65) Prior Publication Data

US 2023/0367918 A1 Nov. 16, 2023

(30) Foreign Application Priority Data

May 13, 2022 (CN) .......................... 202210520747.4

(51) Int. Cl.
*G06F 30/10* (2020.01)
*G06F 111/10* (2020.01)

(52) U.S. Cl.
CPC .......... *G06F 30/10* (2020.01); *G06F 2111/10* (2020.01)

(58) Field of Classification Search
CPC .................. G06F 2111/10; G06F 30/10
See application file for complete search history.

(56) References Cited

U.S. PATENT DOCUMENTS

2014/0037379 A1 2/2014 Ng et al.
2018/0154408 A1 6/2018 Ko et al.

FOREIGN PATENT DOCUMENTS

| CA | 2955844 A1 | 7/2018 |
| CN | 103572785 A | 2/2014 |
| CN | 107091916 A | 8/2017 |
| CN | 113156086 A | 7/2021 |
| EP | 0950439 A2 | 10/1999 |

OTHER PUBLICATIONS

Mahar, R. B., Sahito, A. R., Yue, D., & Khan, K. (2016). Modeling and simulation of landfill gas production from pretreated MSW landfill simulator. Frontiers of Environmental Science & Engineering, 10, 159-167. (Year: 2016).*

* cited by examiner

*Primary Examiner* — Bijan Mapar
(74) *Attorney, Agent, or Firm* — Nitin Kaushik (57) ABSTRACT

The present disclosure discloses a design method of a soil cover layer of a solid waste landfill considering the effect of plant root, which relates to the field of designing a soil cover for a solid waste landfill and aims to solve the problem of the prior art that does not consider the non-linear spatial variation of water content and the effect of plant root on the gas migration process. By comprehensively considering the type of plant root architecture, the distribution of water content varying with space, the errors of calculating gas migration caused by assuming that the water content of the cover layer is constant and ignoring the effect of plant root is effectively reduced; and the actual environment of the on-site cover layer is more comprehensively considered, thus improving the calculation accuracy.

11 Claims, 4 Drawing Sheets

METHOD OF SOIL COVER LAYER OF SOLID WASTE LANDFILL CONSIDERING EFFECT OF PLANT ROOT

CROSS-REFERENCE TO RELATED APPLICATIONS

The application claims priority to Chinese patent application No. 202210520747.4, filed on May 13, 2022, the entire contents of which are incorporated herein by reference.

TECHNICAL FIELD

The present disclosure relates to the field of soil cover layer design of solid waste landfills, in particular to a design method of a soil cover layer of a solid waste landfill considering the effect of plant root.

BACKGROUND

At present, a lot of municipal solid waste and industrial solid waste are produced all over the world every year. The solid waste is usually isolated from the surrounding environment by landfill, which is one of the most economical and effective solid waste disposal methods. A final covering system of a landfill plays an indispensable role just like human skin, which is mainly reflected in the following aspects: 1) preventing the solid waste from being directly exposed to the atmospheric environment; 2) minimizing infiltration of rainwater into the solid waste, thereby reducing leachate generation and relieving potential pollution to surrounding soil and groundwater; and 3) restricting landfill gas (LFG) of the solid waste from being discharged into the atmosphere. At present, a large number of solid waste landfills in China are facing closure; and some old and unqualified landfill cover layers need to be maintained. However, existing landfill cover layers are usually designed according to scope requirements given by relevant codes; and for most of them, gas sealing performance of the cover layers is evaluated based on numerical simulation, but there are few analytical algorithms that consider the gas migration under the influence of water migration. Hence, existing calculation methods are unable to define a direct mathematical relationship between gas migration and water migration, and thus cannot evaluate service performance of the cover layer quickly and reliably. On the other hand, plants are usually planted on the surface of the cover layer. Vegetation not only has a function of ecological re-greening. In addition, water absorption effect of plant root will affect the water and gas migration process in a cover system. Some studies have found that the plant root systems will occupy pore space of soil and change pore size distribution of the soil, which will lead to changes in water retention capacity and permeability of the soil. In recent years, with successive promulgation of Action Plan for Soil Pollution Prevention and Control and Action Plan for Water Pollution Prevention and Control and the goal of "carbon neutrality" in China, standardized design and long-term service performance evaluation of landfill cover layers closely related to the living environment of people have also attracted much attention. Therefore, considering the complex service environment faced by the cover layers, it is particularly important to design the cover layer quickly and flexibly and evaluate the gas sealing effect of the cover layer through reasonable calculation methods with consideration of effect of the plant root and influences of water migration.

Gas emission of the cover layer should meet requirements of overall design of the landfill, and meet exertion of an effective gas sealing function during a service life of the landfill and after closure thereof. At present, those skilled in the art have done some research, but most of the research cannot consider influences of nonlinear spatial changes of water content and effect of the plant root or the like on a gas migration process at the same time, which leads to a great error in practical application; and some commercial numerical software modeling and analysis methods often cannot meet needs of users because incomplete consideration thereof over factors affecting gas migration as well as high economic and technical thresholds. Therefore, there is a technical need in the art for the design method of a soil cover layer with high accuracy and convenient use, which can consider the effect of the plant root and the nonlinear spatial changes of the water content.

SUMMARY

In view of the problems existing in the prior art, the present disclosure discloses a design method of a soil cover layer of a solid waste landfill considering the effect of plant root, which comprehensively considers factors such as the type of plant root architecture, boundary conditions, water content variation with space and the like, effectively reduces the calculation error caused by assuming that the water content of the cover layer is constant and ignoring effect of plants, and further fits with actual service environment where the cover layer is located. The disclosed calculation method is flexible and simple, and solves the problems of complex numerical simulation calculation and unclear variable relationships. According to an adopted technical solution, the method includes the following steps:

Step 1): Constructing a Mathematical Model of a Landfill Cover Layer

Based on a structural form of final covering of a solid waste landfill, determining a calculated thickness L of the cover layer; according to the type of vegetation planted in the cover layer, selecting a corresponding root architecture and determining a depth $L_2$ of the root zone and a depth $L_1$ of the outside root zone of a cover layer structure; based on a geographical location where the cover layer is located and local meteorological conditions, selecting a rainfall intensity $q_{01}$, rainfall time $t_p$, an evaporation intensity $q_{02}$, and a transpiration intensity $T_p$ acting at the surface of the cover layer, and constant head conditions $h_0$ acting at the bottom boundary of the cover layer; according to a gas content situation on top and bottom boundaries of the cover layer, determining top and bottom boundary conditions acting at the cover layer: the top boundary $C_g(z, t)|_{z=L}=C_t$, the bottom boundary $C_g(z, t)|_{z=0}=C_b$ or a constant flux $F_0$ boundary; determining an initial gas concentration value of the cover layer to be $C_g(z, t)|_{t=0}=C_0$; and selecting basic parameters of water migration and gas migration in the cover layer, including: a soil-water characteristic curve (SWCC), a saturated permeability coefficient $k_s$, intrinsic gas permeability $k_i$, a gas diffusion coefficient $D_0$ and a gas type or the like. Relevant data can be determined by field investigation and measurement combined with material parameters and a site type.

Step 2): Calculating a Distribution of Water and Gas Migration in the Cover Layer After constructing the mathematical model of the cover layer and setting the parameters, performing the model calculation:

Step 2.1): Calculating the Volumetric Water Content Distribution in the Cover Layer Volumetric water content distribution in the cover layer is calculated by the following equation:

$$\theta_w = \theta_r + (\theta_s - \theta_r)k^*$$

where: $\theta_s$ and $\theta_r$ indicate the saturated volumetric water content and a residual volumetric water content of soil respectively; and $k^*$ indicates a relative permeability coefficient of the soil. The present disclosure considers four typical root architecture; and the relative permeability coefficient k* of each root architecture can be calculated according to the following equation:

Uniform Root Architecture:

$$k^* = \begin{cases} A + \dfrac{T_p}{k_s L_2}[\exp(-\alpha z) - 1](L - L_1) & \text{outside root zone} \\ A + \dfrac{T_p}{k_s L_2}\left\{ \begin{array}{l} [\exp(-\alpha z) - 1](L - z) + \\ \exp(-\alpha z)[z - L_1 - \alpha^{-1}\exp(\alpha z) + \\ \alpha^{-1}\exp(\alpha L_1)] \end{array} \right\} & \text{inside root zone} \end{cases}$$

Triangular Root Architecture:

$$k^* = \begin{cases} A + \dfrac{2T_p}{k_s L_2^2}[\exp(-\alpha z) - 1]\left[\dfrac{L^2 - L_1^2}{2} - L_1 L + L_1^2\right] & \text{outside root zone} \\ A + \dfrac{2\alpha T_p}{k_s L_2^2}\left\{\dfrac{1}{\alpha}[\exp(-\alpha z) - 1]\left(\dfrac{L^2 - z^2}{2} - L_1 L + L_1 z\right) + \right. \\ \dfrac{1}{\alpha}\exp(-\alpha z)\left[\dfrac{\exp(\alpha L_1)}{\alpha^2}(\alpha L_1 - 1) - \dfrac{\exp(\alpha z)}{\alpha^2}(\alpha z - 1) - \right. \\ \left. L_1 z + L_1^2 - \dfrac{L_1^2 - z^2}{2} - \dfrac{L_1}{\alpha}\exp(\alpha L_1) + \dfrac{L_1}{\alpha}\exp(\alpha z)\right] \right\} & \text{inside root zone} \end{cases}$$

Exponential Root Architecture:

$$k^* = \begin{cases} A + \dfrac{T_p}{k_s}\dfrac{1}{\exp(L_2) - L_2 - 1}[\exp(-\alpha z) - 1]\{L_1 - L + \\ \exp(-L_1)[\exp(L) - \exp(L_1)]\} & \text{outside root zone} \\ A + \dfrac{T_p}{k_s}\left\{\dfrac{\exp(-\alpha z) - 1}{\exp(L_2) - L_2 - 1}\{z - L + \exp(-L_1)[\exp(L) - \exp(z)]\} + \right. \\ \dfrac{\exp(-\alpha z)}{\exp(L_2) - L_2 - 1}\left\{L_1 - z - \dfrac{\exp(\alpha L_1) - \exp(\alpha z)}{\alpha} - \right. \\ \exp(-L_1)[\exp(L_1) - \exp(z)] - \dfrac{\exp(z - L_1 + \alpha z)}{\alpha + 1} + \\ \left.\left. \dfrac{\exp(\alpha L_1)}{\alpha + 1}\right\}\right\} & \text{inside root zone} \end{cases}$$

Parabolic Root Architecture:

$$k^* = \begin{cases} A + \dfrac{6T_p}{k_s L_2^3}[\exp(-\alpha z) - 1]\left[\dfrac{(L - L_1)(2L_1 + L_2)(L + L_1)}{2} - \right. \\ \left. L_1(L - L_1)(L_1 + L_2)\dfrac{(L - L_1)(L^2 + LL_1 + L_1^2)}{3}\right] & \text{outside root zone} \\ A + \dfrac{6T_p}{k_s L_2^3}\left\{[\exp(-\alpha z) - 1]\left[\dfrac{(L + z)(2L_1 + L_2)(L - z)}{2} - \right.\right. \\ \dfrac{(L - z)(L^2 + Lz + z^2)}{3} - L_1(L - z)(L_1 + L_2)\right] + \exp(-\alpha z)\left[z^2\left(L_1 - \dfrac{z}{3}\right) - \right. \\ zL_1^2 + L_1^3/3 - L_1^2 L_2/2 - \dfrac{L_2}{\alpha^2}\exp(\alpha z)(\alpha z - 1) + L_1^2 L_2 + \\ \dfrac{L_2}{\alpha_2}\exp(\alpha L_1)(\alpha L_1 - 1) + L_2 z^2/2 - zL_1 L_2 - \dfrac{L_1 L_2}{\alpha}\exp(\alpha L_1) + \\ \dfrac{L_1 L_2}{\alpha}\exp(\alpha z) + \dfrac{\exp(\alpha z)}{\alpha^3}(\alpha^2 L_1^2 + 2\alpha L_1 - 2zL_1\alpha^2 + \\ \left.\left. z^2\alpha^2 - 2\alpha z + 2) - \dfrac{2\exp(\alpha L_1)}{\alpha^3}\right]\right\} & \text{inside root zone} \end{cases}$$

Where: $A = \begin{cases} \exp[\alpha(h_0 - z)] - q_{01}[\exp(-\alpha z) - 1]/k_s & t \leq t_p \\ \exp[\alpha(h_0 - z)] - q_{02}[\exp(-\alpha z) - 1]/k_s & t > t_p \end{cases}$;

where: A is relative permeability coefficient when ignoring the effect of plant root; $q_{01}$ is the rainfall intensity (unit: mm/day); $q_{02}$ is the evaporation intensity (unit: mm/day); $h_0$ is the water head boundary at the bottom of the cover layer (unit: m); $T_p$ is the transpiration intensity (unit: mm/day); L is the thickness of the cover layer (unit: m); $L_1$ is the thickness of a root-free zone layer (unit: m); $L_2$ is the thickness of the root zone layer (unit: m); $\alpha$ is the desaturation coefficient of the soil (unit: $m^{-1}$); $k_s$ is the saturated permeability coefficient of the soil (unit: m/s); and z is the vertical coordinate from the bottom of the cover layer (unit: m).

Step 2.2): Calculating the Gas Distribution in the Cover Layer

Concentration distribution of the landfill gas in the cover layer is calculated according to the following equation:

$$C_g(z,t) = Y^T[\exp(-\int_0^t H d\tau)T(0) + \exp(-\int_0^t H d\tau)\int_0^t \exp(\int_0^\tau H d\tau')G d\tau] + B$$

where: $C_g$ (z,t) is the concentration of landfill gas in the cover layer (unit: mol/m³); Y is an n×1-order matrix constituted of $$\dfrac{\psi_n(z)}{N_n^{1/2}};$$

$\psi_n(z)$ is the characteristic function; $N_n$ is a constant related to the orthogonality of the characteristic function $\psi_n(z)$; H is an n×r-order matrix constituted of $H_{nr}$; $H_{nr}$ is the time factor related to gas migration; T is an n×1-order matrix constituted of $T_n$; $T_n$ is the generalized integral transformation formula related to the gas concentration; G is an n×1-order matrix constituted of $G_n$; $G_n$ is an integral transformation; and B is a function related to boundary conditions.

The variables $H_{nr}$, $T_n$, $$\dfrac{\psi_n(z)}{N_n^{1/2}};$$

and $G_n$ related in the calculation equation of landfill gas concentration distribution in the cover layer can be determined by the following equation:

$$H_{nr} = -\dfrac{1}{N_n^{1/2} N_r^{1/2}}\int_0^L \dfrac{\theta_g D_s}{\theta_g + H_g \theta_w}\dfrac{\partial^2 \psi_n(z)}{\partial z^2}\psi_r(z)dz -$$

$$\dfrac{1}{N_n^{1/2} N_r^{1/2}}\int_0^L \dfrac{\partial(\theta_g D_s)/\partial z - (v_w H_g + v_g)}{\theta_g + H_g \theta_w}\dfrac{\partial \psi_n(z)}{\partial z}\psi_r(z)dz +$$

$$\dfrac{1}{N_n^{1/2} N_r^{1/2}}\int_0^L \dfrac{\partial(v_w H_g + v_g)/\partial z + \mu \theta_g}{\theta_g + H_g \theta_w}\psi_n(z)\psi_r(z)dz;$$

$$T_n(t) = \dfrac{1}{N_n^{1/2}}\int_0^L \psi_n(z)u_g(z,t)dz;$$

$$N_n = \int_0^L \psi_n^2(z)dz;$$

$$G_n = \dfrac{1}{N_n^{1/2}}\int_0^L G(z,t)\psi_r(z)dz;$$

where: G(z, t) is an intermediate variable related to the gas concentration; $\psi_r(z)$ and $\psi_n(z)$ are characteristic functions; $H_g$ is the Henry's coefficient; $\theta_g$ is the volumetric gas content of the soil; $D_s$ is the effective diffusion coefficient of gas; $v_w$ is the velocity of water flow; $v_g$ is the advective velocity of gas; and $N_r$ is a constant related to orthogonality of the characteristic function $\psi_r(z)$; and Further, according to actual situations of domestic landfills, the present disclosure considers two different bottom boundary conditions for gas migration, namely a constant concentration boundary and a constant flux boundary. Therefore, B, $\psi_n(z)$ and $G(z,t)$ can be determined according to different bottom boundary conditions:

① When the bottom boundary condition of the landfill cover system is a constant concentration boundary:

$$B = C_b\left(1 - \frac{z}{L}\right) + C_t\frac{z}{L};$$

$$G(z,t) = \frac{\partial(\theta_g D_s)/\partial z - (v_w H_g + v_g)}{(\theta_g + \theta_w H_g)L}(C_t - C_b) - \frac{\partial(v_w H_g + v_g)/\partial z + \mu\theta_g}{\theta_g + \theta_w H_g}B;$$

$$\psi_n(z) = \sin\left(\frac{k\pi z}{L}\right) \quad k = 1,2,3,\ldots;$$

② When the bottom boundary condition of the landfill cover system is a constant flux boundary:

$$B = \left.\frac{F_0}{\theta_g D_s}\right|_{z=0}(z - L) + C_t;$$

$$G(z,t) = \frac{\partial(\theta_g D_s)/\partial z - (v_w H_g + v_g)}{\theta_g + \theta_w H_g}\left.\frac{F_0}{\theta_g D_s}\right|_{z=0} - \frac{\partial(v_w H_g + v_g)/\partial z + \mu\theta_g}{\theta_g + \theta_w H_g}B;$$

$$\psi_n(z) = \sin\left[\frac{(2k-1)\pi}{2L}(L-z)\right] \quad k = 1,2,3,\ldots;$$

where: $\theta_g$ is the volumetric gas content of the soil; $D_s$ is the effective diffusion coefficient of gas (unit: m²/s); $H_g$ is the Henry's coefficient; $v_w$ is the velocity of water flow (unit: m/s); $v_g$ is the advective velocity of gas (unit: m/s); $C_b$ is the gas concentration at the bottom of the cover layer (mol/m³); $C_t$ is the gas concentration on the top of the cover layer (mol/m³); $F_0$ is the gas flux at the bottom of the cover layer (mol/m²/day); and $\mu$ is the degradation rate of the landfill gas (unit: s⁻¹).

The effective diffusion coefficient $D_s$ of gas, the flow velocity $v_w$ of water and the advective velocity $v_g$ of gas can be calculated by the following equations:

$$D_s = \frac{[(1-S_w)\phi]^{10/3}}{\phi^2}D_0;$$

$$v_w = -k(h)\left(\frac{\partial h}{\partial z} + 1\right);$$

$$v_g = -k_{rg}\frac{k_i}{\mu_g}\frac{\partial P_g}{\partial z};$$

$$h = \frac{1}{\alpha}\ln k^*;$$

$$k_{rg} = \sqrt{1-S_e}\left[1 - S_e^{1/m}\right]^{2m};$$

where: $S_w$ is the degree of saturation, which can be expressed as $S_w = \theta_w/\phi$; $\phi$ is the porosity of the soil; $D_0$ is the diffusion coefficient of gas in free gas phase (unit: m²/s); $\mu_g$ is the viscosity of gas (unit: Pa·s); $P_g$ is the gas pressure (unit: Pa); $k_{rg}$ is the relative coefficient of gas permeability; m is the Van Genuchten's parameter; and $S_e$ is the effective degree of saturation, which can be expressed as $S_e = (\theta_w - \theta_r)/(\theta_s - \theta_r)$.

According to the analytical solution of the gas concentration in the cover layer, the gas emission rate at the surface of the cover layer can be calculated:

$$J = \left[C_g(z,t) \times (v_g + v_w H_g) - \theta_g D_s \frac{\partial C_g(z,t)}{\partial t}\right]_{z=L}$$

where: J is the gas emission rate at the surface of the cover layer (unit: mol/m²/day).

Step 3): Evaluating Service Performance of the Landfill Cover Layer

According to the calculation, changing curves of the gas emission rate at the surface of the cover layer with time can be drawn under various different design conditions. After a period of action of rainfall and drying, if the gas emission rate J at the surface of the cover is less than the allowable gas emission standard limit value $J_L$ at the surface of the cover, it indicates that the cover layer has a good gas sealing effect and excellent service performance under the working condition, and the gas does not breakthrough the cover layer. On the contrary, when the gas emission rate J at the surface of the cover is greater than the allowable gas emission standard limit value $J_L$ at the surface of the cover layer, it indicates that the gas sealing effect of the cover layer is poor under the working condition, and the gas breakthrough the cover layer; the time corresponding to reach the standard limit value $J_L$ is the breakthrough time $T_j$ of the landfill gas.

The present disclosure has the beneficial effects: by comprehensively considering factors such as the plant root architecture, water content distribution varying with space and the like, the present disclosure effectively reduces the error of calculating gas migration caused by assuming that the water content of the cover layer is constant and ignoring the effect of plant root, and more comprehensively considers the actual environment where the on-site cover layer is located, thereby improving calculation accuracy.

Further, by setting the soil model parameters, boundary conditions and other working conditions, according to theoretical analysis, the migration of landfill gas in the cover layer under various working conditions can be obtained, so that the service performance of the cover layer under various conditions can be comprehensively evaluated. Therefore, the type of cover structure that meets the service requirements can be selected in the design stage, or the existing cover structure can be maintained to meet the service requirements.

Further, the present disclosure has good flexibility, can be flexibly set according to needs of users, is easy to realize and is beneficial to application of complex engineering conditions.

DETAILED DESCRIPTION OF THE EMBODIMENTS

In order to make the purpose, technical solutions and advantages of the present disclosure clearer, the present disclosure will be further described in detail with the attached drawings and embodiments. It should be understood that the specific embodiments described here are only used to explain the present disclosure, and are not used to limit the present disclosure. In addition, technical features involved in various implementations of the present disclosure described below can be combined with each other as long as they do not conflict with each other.

Mainly according to weather conditions and the landfill environment of a landfill cover layer, the present disclosure obtains water and gas migration parameters of the landfill cover layer, selects a type of plant root architecture of the cover layer and sets a depth of the root zone in the cover layer, determines water and gas migration boundary conditions acting on and under the cover layer, and calculates the gas emission rate at the surface of the cover layer under the effect of plant root in combination with the service process of the landfill cover layer, so that the service performance of the cover layer under this condition can be comprehensively evaluated. Further, parameters can be changed to calculate different working conditions; and the type of cover structure that meets the service requirements can be selected, or the existing cover structure can be maintained to meet the service requirements.

Embodiment 1

This embodiment takes migration of methane as a landfill gas in the cover layer as an embodiment to further explain the present disclosure.

Figure 1:
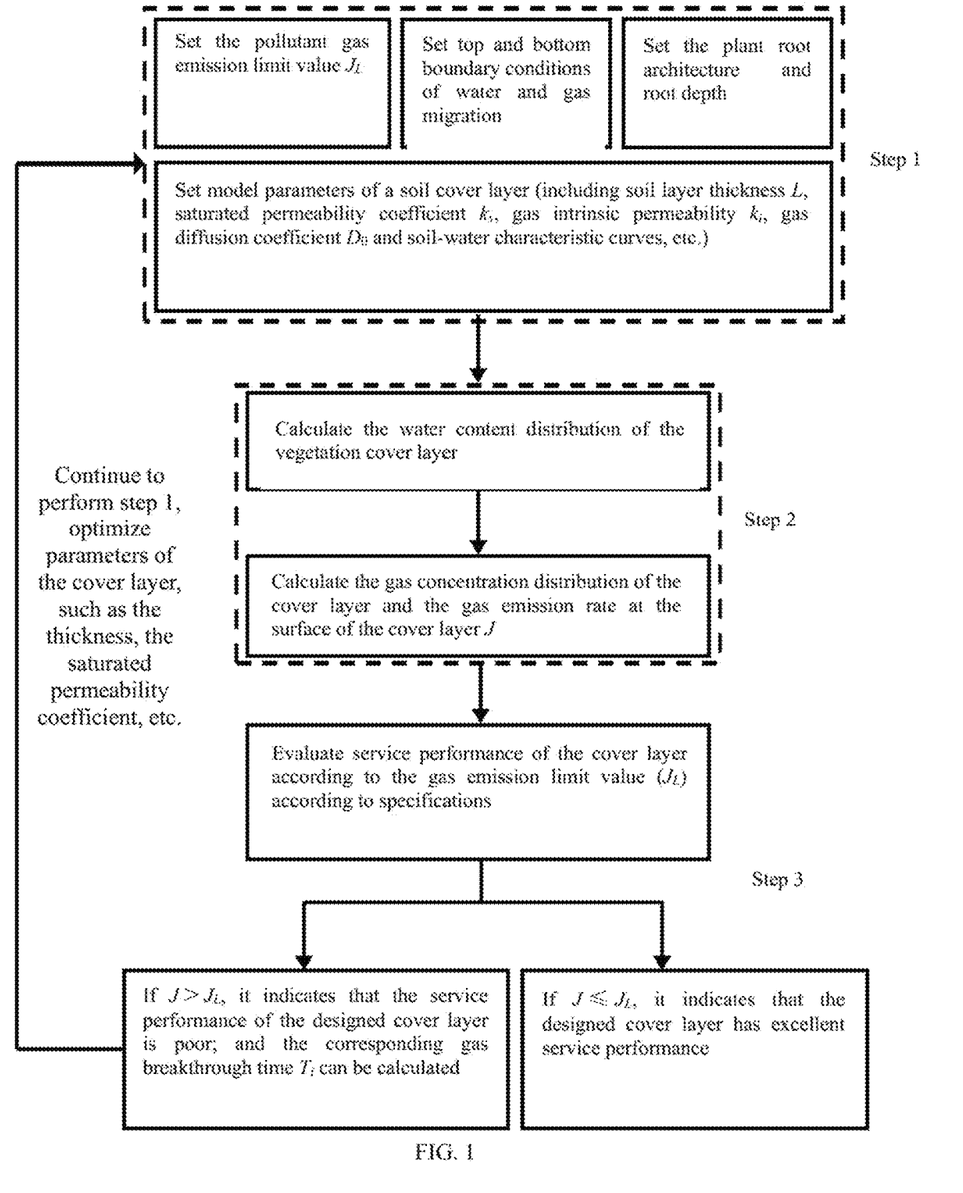
FIG. 1 is a schematic flow chart of the present disclosure.

As shown in FIG. 1, the present disclosure discloses a design method for a soil cover layer of a solid waste landfill considering the effect of plant root. According to an adopted technical solution, the method includes 3 steps: step 1 is the construction of a mathematical model of the cover layer, which mainly determines the thickness of the soil cover layer, the type of root architecture, the depth of the root zone, and the top and bottom boundary conditions of water and gas migration; step 2 is the calculation of the distribution of water and gas migration in the cover layer, which mainly calculates the gas concentration in the cover layer and the gas emission rate at the surface of the cover layer considering the effect of plant root and water migration; step 3 is evaluation the service performance of the cover layer, according to the gas emission rate limit value given by relevant specifications, if the calculated gas emission rate at the surface of the cover layer is less than the gas emission rate limit value, it indicates that the cover layer has excellent service performance under the working condition; and on the contrary, when the calculated gas emission rate at the surface of the cover layer is greater than the gas emission rate limit value, it indicates that the gas sealing effect of the cover layer is poor, and the gas breakthrough the cover layer under the working condition. Further, model parameters can be reset as needed to assist designers to optimize the cover structure at the early stage of design or to maintain and control the existing filed cover layer to meet the emission requirements.

Step 1): Constructing a Mathematical Model of the Cover Layer

Figure 2:
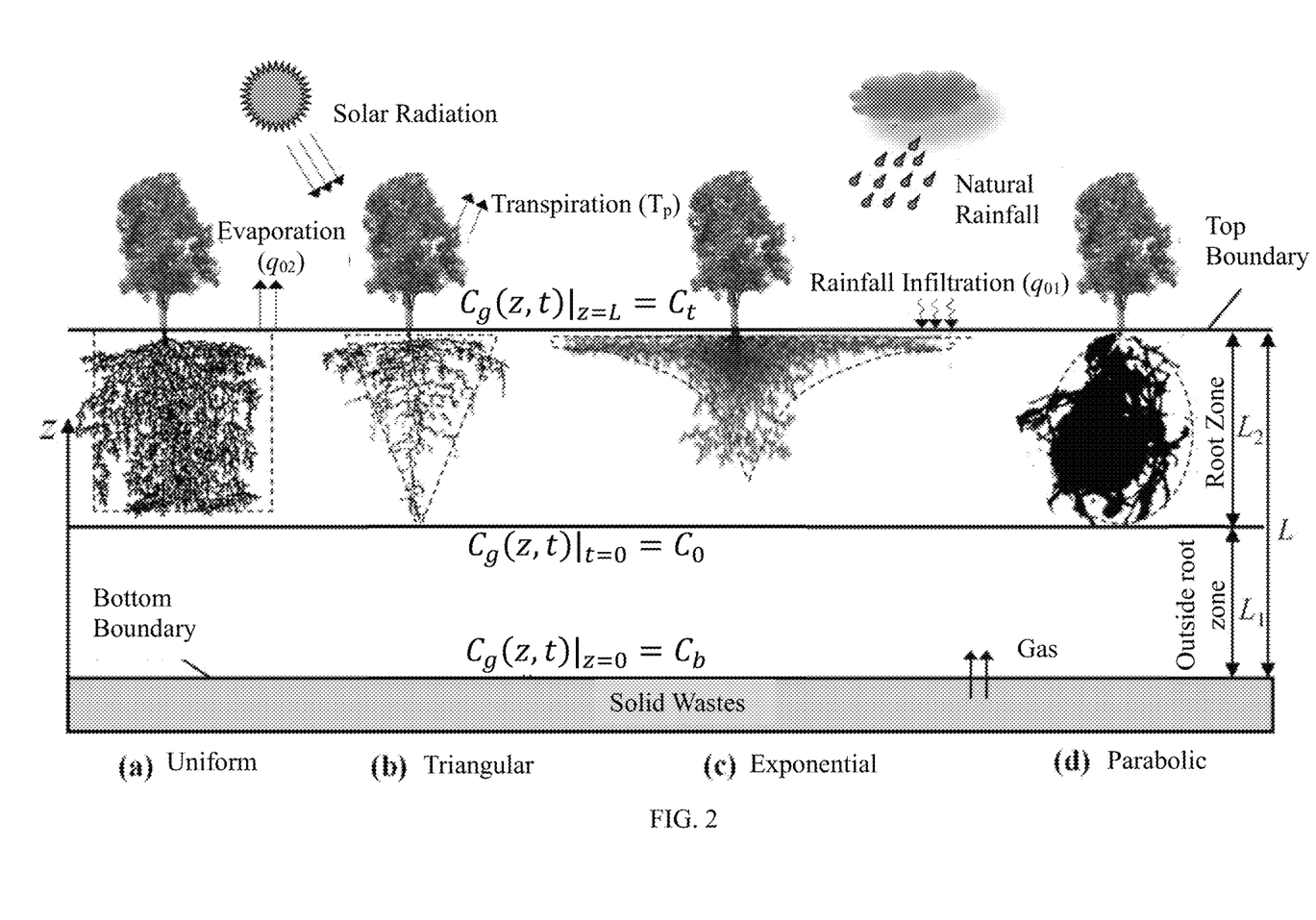
FIG. 2 is a schematic diagram of the calculation model of the present disclosure.

As shown in FIG. 2, the cover layer calculation model of the present disclosure mainly includes the following parts: vegetation layer soil, soil outside the root zone and the industrial solid waste layer. Specific soil parameters: soil layer thickness L=0.9 m, the depth of the root zone $L_2$=0.3 m, the depth of the outside root zone $L_1$=0.6 m; the uniform root architecture is adopted for calculation; the cover layer soil is compacted loess; the basic parameters of the vegetated soil are: SWCC: $\theta_s$=0.47 and $\theta_r$=0.1; the desaturation coefficient $\alpha$=0.2 $m^{-1}$; the saturated permeability coefficient of the soil is $1.0\times10^{-7}$ m/s; the intrinsic permeability of soil is $4.8\times10^{-16}$ $m^2$; and the diffusion coefficient of gas in free gas phase is $D_0$=$2.12\times10^{-5}$ $m^2$/s.

According to regional weather conditions of typical landfills in China and according to the design of once-in-50-year heavy rain, it is assumed that the continuous rainfall time is $t_p$=24 h. Hence, the rainfall intensity of the cover layer is $q_{o1}$=40 mm/day. Then, there is continuous drought with an evaporation rate of $q_{o2}$=4 mm/day and a transpiration rate of $T_p$=6 mm/day; and the constant water head boundary at the bottom of the cover layer is taken as $h_0$=−3.5 m.

According to the emission situations of polluted gas in the domestic landfills, the present disclosure adopts methane gas as the migration gas for design. The initial methane concentration in the cover layer is selected as $C_0$=0 mol/$m^3$, the top methane concentration of the cover layer is $C_t$=0 mol/$m^3$, and the methane concentration at the bottom of the cover layer is taken as $C_b$=8 mol/$m^3$ according to the gas production at the bottom of the solid waste landfill. Reference specification: Australian Design Standard CFI, 2013 stipulates that an emission limit of landfill gas methane is 7.2 g/$m^2$/day, so the allowable methane emission rate at the surface of the cover layer here is specified as $J_L$=7.2 g/$m^2$/day.

Step 2): Calculating the Distribution Situation of Water and Gas Migration in the Cover Layer After establishing the mathematical model and setting parameters of the cover layer considering the effect of plant root, the distribution of the volumetric water content of the cover layer with space is obtained by calculation at first; and then the variation of the gas concentration of the cover layer with space and time is obtained.

According to the calculation results of gas concentration of the vegetation cover layer obtained from the above steps, and then according to the calculation equation of the gas emission rate, the gas emission rate curves of the cover layer with time under different working conditions can be obtained.

Step 3): Evaluating Service Performance of the Landfill Cover Layer

Figure 3:
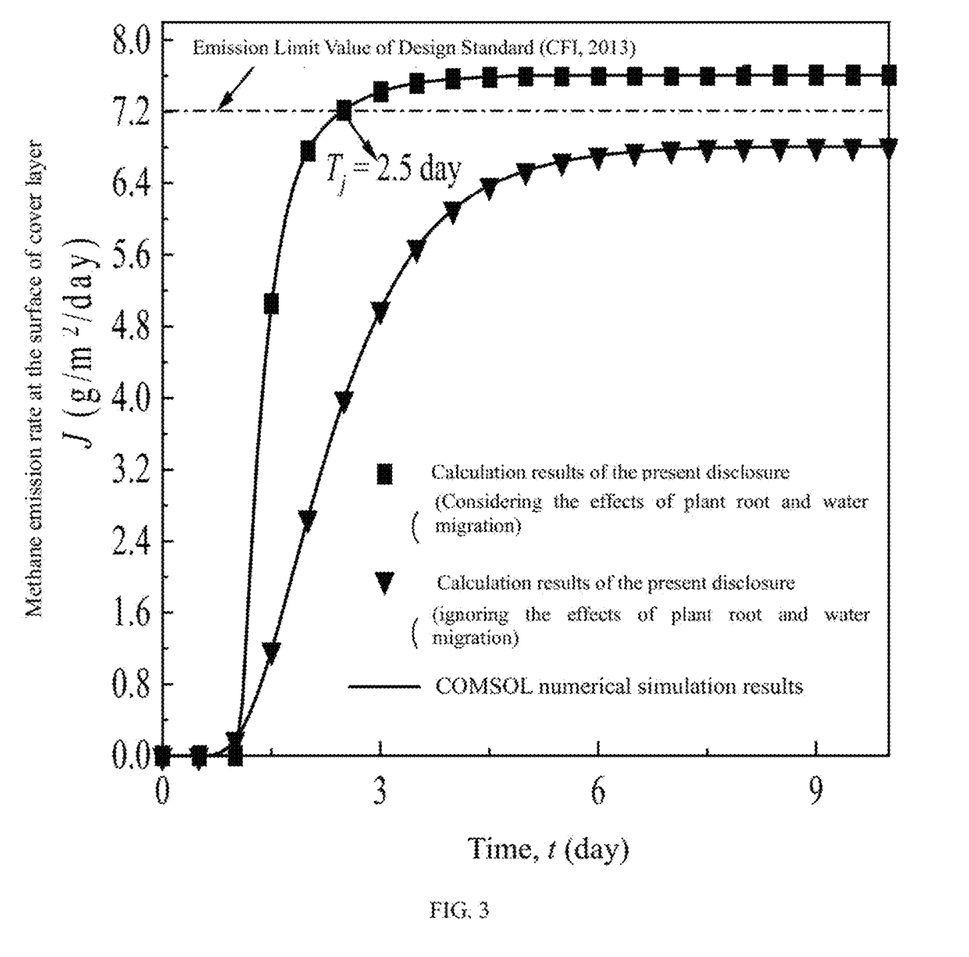
FIG. 3 is a schematic diagram showing the comparison between the gas emission rate at the surface of a cover layer calculated in the present disclosure and numerical simulation results, and comparison results with and without considering the effect of plant root and water migration.
Figure 4:
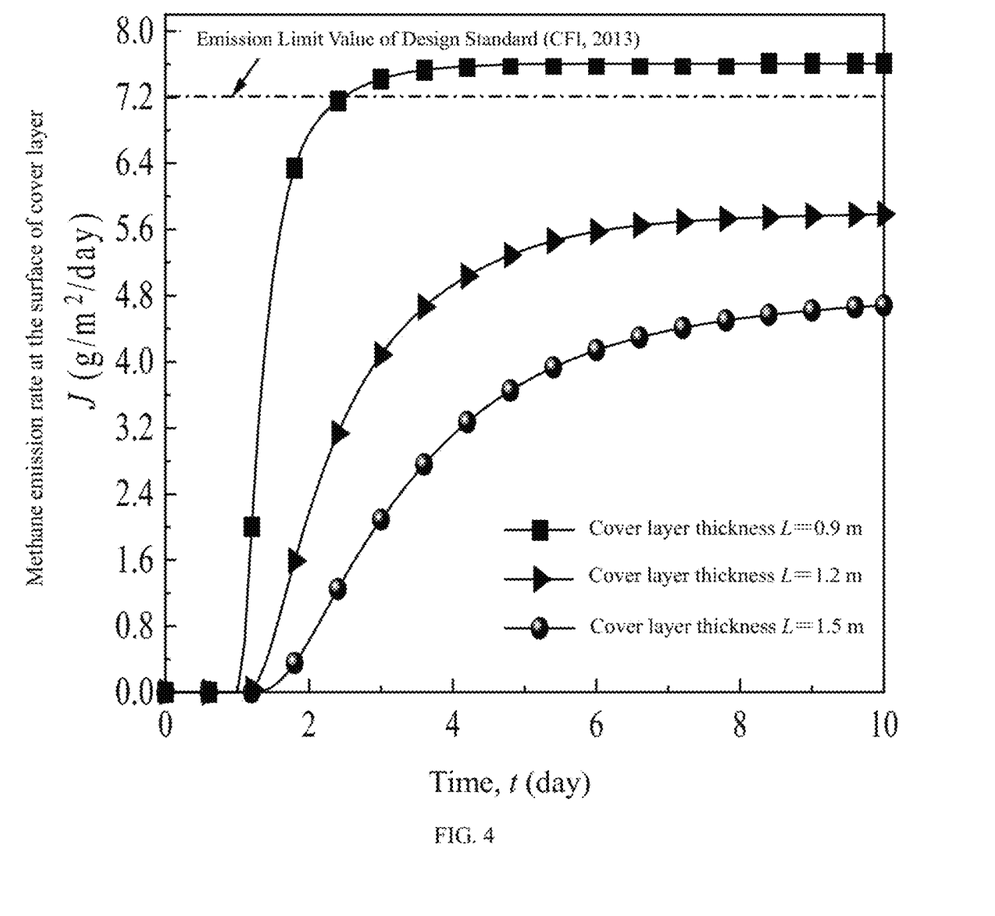
FIG. 4 is a comparative diagram of curves showing the gas emission rate at the surface of a cover layer varying with time, calculated by changing the thickness of the cover layer.

The curve of the gas emission rate on the surface of the cover layer with time calculated by the present disclosure is shown in FIGS. 3 and 4. As can be seen from FIG. 3, the gas calculation method provided by the present disclosure is basically consistent with the change trend of numerical results obtained by numerical software COMSOL based on a theoretical equation, which fully shows that the design method of the soil cover layer considering the effect of plant root designed by the present disclosure is high in accuracy. Meanwhile, as shown in FIG. 3, the calculation result considering the effect of plant root and the influence of water migration is more accurate, while ignoring the effect of plant root and water migration will underestimate the gas emission rate and overestimate the gas breakthrough time. It is thus clear that the traditional design calculation method ignoring the influences of plants and water migration has certain risks, which also proves that the present disclosure is more accurate.

In addition, according to the calculation results of the present disclosure under the working condition shown in FIG. 3, it is found that the gas emission rate has exceeded the gas emission limit value $J_L$, so it is necessary to continue to perform the first step. Here, the cover layer design is completed only by changing the cover layer thickness as an example. FIG. 4 shows a comparison diagram of the gas emission rate at the surface of the cover layer under two optimized designs (L=1.2 m and L=1.5 m) and an original working condition (L=0.9 m). It is thus clear that increasing the thickness can greatly reduce the gas emission rate. In this way, the cover layer structure meeting the requirements is designed. Meanwhile, the parameters of the cover layer can be set flexibly according to an actual situation and economic effects, so as to obtain a more economical cover layer structure that meets the requirements of gas sealing. It can be seen that the present disclosure is convenient and can be set flexibly according to the needs of users.

The present disclosure provides a design method for the soil cover layer of a solid waste landfill considering the effect of plant root, which comprehensively considers factors such as the type of plant root architecture, boundary conditions, water content distribution changing with space and the like, effectively reduces the calculation error caused by assuming constant water content distribution of the cover layer and ignoring the effect of plants, and further fits with an actual service environment where the cover layer is located at the engineering site. The calculation method is flexible and simple, and solves the problems of complex numerical simulation calculation and unclear variable relationships.

Although the specific embodiments of the present disclosure have been described in detail above, the present disclosure is not limited to the above embodiments, and various changes can be made within the knowledge of those ordinarily skilled in the art without departing from the purpose of the present disclosure, while modifications or deformations without creative labor are still within the protection scope of the present disclosure.

What is claimed is:

1. A method for improving gas sealing effect of an existing soil cover layer of a solid waste landfill considering the effect of plant root, comprising:
   obtaining a gas emission rate J at a surface of the existing soil cover layer and an allowable gas emission standard limit value $J_L$ at the surface of the existing soil cover layer, wherein the allowable gas emission standard limit value $J_L$ at the surface of the existing soil cover layer is determined according to Australian Design Standard CFI.2013; and
   increasing a thickness of the existing soil cover layer if the gas emission rate J at the surface of the existing soil cover layer is greater than the allowable gas emission standard limit value $J_L$ at the surface of the existing soil cover layer;
   wherein obtaining the gas emission rate J at the surface of the existing soil cover layer comprises:
   Step 1, constructing a mathematical model of the cover layer, wherein the step 1 comprises:
   based on a structural type of final cover of the solid waste landfill, determining a calculated thickness L of the cover layer; according to a type of vegetation planted in the cover layer, selecting a corresponding root architecture and determining a depth $L_2$ of a root zone layer and a depth $L_1$ of a root-free zone layer; based on a geographical location where the cover layer is located and local meteorological conditions, selecting a rainfall intensity $q_{o1}$, a rainfall time $t_p$, an evaporation intensity $q_{o2}$, and a transpiration intensity $T_p$ acting at the surface of the cover layer, and constant head conditions $h_0$ acting at a bottom boundary of the cover layer; according to a gas content at a top boundary of the cover layer and the bottom boundary of the cover layer, determining a gas concentration $C_t$ condition acting at the top boundary of the cover layer and a constant concentration $C_b$ or a constant flux $F_0$ condition at the bottom boundary; and selecting basic parameters of water and gas migration in the cover layer, wherein the basic parameters of water and gas migration in the cover layer further compromise a soil-water characteristic curve, a saturated water permeability coefficient $k_s$, a gas intrinsic permeability $k_i$, a gas diffusion coefficient $D_0$ and a gas type;
   Step 2, calculating a distribution of water and gas migration in the cover layer, wherein the step 2 comprises:
   after constructing the mathematical model of the cover layer and setting the parameters, performing model calculation to obtain the gas emission rate J.

2. The design method according to claim 1, wherein the model calculation in step 2 comprises the calculation of water content distribution of the cover layer, the calculation of gas distribution of the cover layer and the calculation of the gas emission rate at the surface of the cover layer.

3. The method according to claim 2, wherein a calculation equation of the water content distribution of the cover layer is:

$$\theta_w = \theta_r + (\theta_s - \theta_r)k^*$$

where: $\theta_s$ and $\theta_r$ are saturated volumetric water content and residual volumetric water content of soil respectively; and $k^*$ is relative permeability coefficient of soil.

4. The method according to claim 3, wherein the relative permeability coefficient of soil comprises four different root architectures, namely a uniform root architecture, a triangular root architecture, an exponential root architecture and a parabolic root architecture.

5. The method according to claim 4, wherein the calculation equations of the relative permeability coefficients corresponding to the four different root architectures are as follows:

uniform root architecture:

$$k^* = \begin{cases} A + \dfrac{T_p}{k_s L_2}[\exp(-\alpha z) - 1](L - L_1) \\ A + \dfrac{T_p}{k_s L_2^2}\left\{ \begin{array}{l} [\exp(-\alpha z) - 1](L - z) + \exp(-\alpha z) \\ [z - L_1 - \alpha^{-1}\exp(\alpha z) + \alpha^{-1}\exp(\alpha L_1)] \end{array} \right\} \end{cases}$$

triangular root architecture:

$$k^* = \begin{cases} A + \dfrac{2T_p}{k_s L_2^2}[\exp(-\alpha z) - 1]\left[\dfrac{L^2 - L_1^2}{2} - L_1 L + L_1^2\right] \\ A + \dfrac{2\alpha T_p}{k_s L_2^2}\left\{ \dfrac{1}{\alpha}[\exp(-\alpha z) - 1]\left(\dfrac{L^2 - z^2}{2} - L_1 L + L_1 z\right) + \right. \\ \dfrac{1}{\alpha}\exp(-\alpha z)\left[\dfrac{\exp(\alpha L_1)}{\alpha^2}(\alpha L_1 - 1) - \dfrac{\exp(\alpha z)}{\alpha^2}(\alpha z - 1) - \right. \\ \left. L_1 z + L_1^2 - \dfrac{L_1^2 - z^2}{2} - \dfrac{L_1}{\alpha}\exp(\alpha L_1) + \dfrac{L_1}{\alpha}\exp(\alpha z)\right] \end{cases}$$

exponential root architecture:

$$k^* = \begin{cases} A + \dfrac{T_p}{k_s} \dfrac{1}{\exp(L_2) - L_2 - 1}[\exp(-\alpha z) - 1] \\ \{L_1 - L + \exp(-L_1)[\exp(L) - \exp(L_1)]\} \\ A + \dfrac{T_p}{k_s}\left\{\dfrac{\exp(-\alpha z) - 1}{\exp(L_2) - L_2 - 1}\{z - L + \exp(-L_1)[\exp(L) - \exp(z)]\} + \right. \\ \dfrac{\exp(-\alpha z)}{\exp(L_2) - L_2 - 1}\left\{L_1 - z - \dfrac{\exp(\alpha L_1) - \exp(\alpha z)}{\alpha} - \right. \\ \left.\left.\exp(-L_1)[\exp(L_1) - \exp(z)] - \dfrac{\exp(z - L_1 + \alpha z)}{\alpha + 1} + \dfrac{\exp(\alpha L_1)}{\alpha + 1}\right\}\right\} \end{cases}$$

parabolic root architecture:

$$k^* = \begin{cases} A + \dfrac{6T_p}{k_s L_2^3}[\exp(-\alpha z) - 1]\left[\dfrac{(L - L_1)(2L_1 + L_2)(L + L_1)}{2} - \right. \\ \left. L_1(L - L_1)(L_1 + L_2)\dfrac{(L - L_1)(L^2 + LL_1 + L_1^2)}{3}\right] \\ A + \dfrac{6T_p}{k_s L_2^3}\left\{[\exp(-\alpha z) - 1]\left[\dfrac{(L + z)(2L_1 + L_2)(L - z)}{2} - \right.\right. \\ \left.\dfrac{(L - z)(L^2 + Lz + z^2)}{3} - L_1(L - z)(L_1 + L_2)\right] + \exp(-\alpha z) \\ \left[z^2\left(L_1 - \dfrac{2}{3}\right) - zL_1^2 + L_1^3/3 - L_1^2 L_2/2 - \dfrac{L_2}{\alpha^2}\exp(\alpha z)(\alpha z - 1) + L_1^2 L_2 + \right. \\ \dfrac{L_2}{\alpha^2}\exp(\alpha L_1)(\alpha L_1 - 1) + L_2 z^2/2 - zL_1 L_2 - \dfrac{L_1 L_2}{\alpha}\exp \\ \exp(\alpha L_1) + \dfrac{L_1 L_2}{\alpha}\exp(\alpha z) + \dfrac{\exp(\alpha z)}{\alpha^3}(\alpha^2 L_1^2 + 2\alpha L_1 - 2zL_1\alpha^2 + \\ \left.\left. z^2\alpha^2 - 2\alpha z + 2) - \dfrac{2\exp(\alpha L_1)}{\alpha^3}\right]\right\} \end{cases}$$

where: $A = \begin{cases} \exp[\alpha(h_0 - z)] - q_{01}[\exp(-\alpha z) - 1]/k_s & t \leq t_p \\ \exp[\alpha(h_0 - z)] - q_{02}[\exp(-\alpha z) - 1]/k_s & t > t_p \end{cases}$ where: A is relative permeability coefficient when effect of plant root is ignored; $\alpha$ is desaturation coefficient of the soil; z is vertical coordinate from the bottom of the cover layer.

6. The method according to claim 2, wherein the calculation equation of the gas distribution of the cover layer is:

$$C_g(z,t) = Y^T[\exp(-\int_0^t H d\tau)T(0) + \exp(-\int_0^t H d\tau)\int_0^t \exp(\int_0^\tau H d\tau')G d\tau] + B$$

where: $C_g$ (z,t) is a landfill gas concentration in the cover layer; Y is an n×1-order matrix constituted of $$\dfrac{\psi_n(z)}{N_n^{1/2}}$$

$\psi_n(z)$ is a characteristic function and $N_n$ is a constant related to the orthogonality of the characteristic function $\psi_n(z)$; H is an n×r-order matrix constituted of $H_{nr}$, $H_{nr}$ is a time factor related to gas migration; T is an n×1-order matrix constituted of $T_n$, $T_n$ is the generalized integral transformation formula related to the gas concentration; G is an n×1-order matrix constituted of $G_n$, $G_n$ is an integral transformation; and B is a function related to boundary conditions.

7. The method according to claim 6, wherein $H_{nr}$, $T_n$, $$\dfrac{\psi_n(z)}{N_n^{1/2}}$$

and $G_n$ are determined by the following equation:

$$H_{nr} = -\dfrac{1}{N_n^{1/2}N_r^{1/2}}\int_0^L \dfrac{\theta_g D_s}{\theta_g + H_g \theta_w} \dfrac{\partial^2 \psi_n(z)}{\partial z^2}\psi_r(z)dz - $$

$$\dfrac{1}{N_n^{1/2}N_r^{1/2}}\int_0^L \dfrac{\partial(\theta_g D_s)/\partial z - (v_w H_g + v_g)}{\theta_g + H_g \theta_w}\dfrac{\partial \psi_n(z)}{\partial z}\psi_r(z)dz + $$

$$\dfrac{1}{N_n^{1/2}N_r^{1/2}}\int_0^L \dfrac{\partial(v_w H_g + v_g)/\partial z + \mu \theta_g}{\theta_g + H_g \theta_w}\psi_n(z)\psi_r(z)dz;$$

$$T_n(t) = \dfrac{1}{N_n^{1/2}}\int_0^L \psi_n(z)u_g(z,t)dz;$$

$$N_n = \int_0^L \psi_n^2(z)dz;$$

$$G_n = \dfrac{1}{N_n^{1/2}}\int_0^L G(z,t)\psi_r(z)dz;$$

where: $\psi_r(z)$ and $\psi_n(z)$ are the characteristic functions: $H_g$ is the Henry's coefficient: $\theta_g$ is the volumetric gas content of the soil: $D_s$ is the effective diffusion coefficient of gas: $v_w$ is the velocity of water flow; and $N_r$ is the constant related to orthogonality of the characteristic function $\psi_r(z)$; z is the vertical coordinate from the bottom of the cover layer, B is the function related to boundary conditions: G(z, t) is the intermediate variable related to the gas concentration and B, $\psi_n(z)$ and G(z,t) are determined according to different bottom boundary conditions.

8. The method according to claim 7, wherein the bottom boundary conditions comprise a constant concentration boundary and a constant flux boundary; and for the different bottom boundary conditions, calculation equations of B, $\psi_n(z)$ and G(z,t) are as follows:

when the bottom boundary condition of the cover layer is a constant concentration boundary:

$$B = C_b\left(1 - \dfrac{z}{L}\right) + C_t \dfrac{z}{L};$$

$$G(z,t) = \dfrac{\partial(\theta_g D_s)/\partial z - (v_w H_g + v_g)}{(\theta_g + \theta_w H_g)L}(C_t - C_b) - \dfrac{\partial(v_w H_g + v_g)/\partial z + \mu \theta_g}{\theta_g + \theta_w H_g}B;$$

$$\psi_n(z) = \sin\left(\dfrac{k\pi z}{L}\right);$$

when the bottom boundary condition of the cover layer is a constant flux boundary:

$$B = \dfrac{F_0}{\theta_g D_s}\bigg|_{z=0}(z - L) + C_t;$$

$$G(z,t) = \dfrac{\partial(\theta_g D_s)/\partial z - (v_w H_g + v_g)}{\theta_g + \theta_w H_g}\dfrac{F_0}{\theta_g D_s}\bigg|_{z=0} - \dfrac{\partial(v_w H_g + v_g)/\partial z + \mu \theta_g}{\theta_g + \theta_w H_g}B;$$

$$\psi_n(z) = \sin\left[\dfrac{(2k-1)\pi}{2l}(L - z)\right];$$

$$\psi_n(z) = \sin\left[\dfrac{(2k-1)\pi}{2L}(L - z)\right];$$

where: $\theta_g$ is the volumetric gas content of the soil; $D_s$ is the effective diffusion coefficient of gas; $H_g$ is the Henry's coefficient; $v_w$ is the velocity of water flow; $v_g$ is the advective velocity of gas; $C_b$ is the gas concentration at the bottom of the cover layer; $C_t$ is the gas concentration at the top of the cover layer; $F_0$ is the gas flux at the bottom of the cover layer; μ is the degradation rate of the landfill gas; L is thickness of the cover layer; z is the vertical coordinate from the bottom of the cover layer; and k is set to be a positive integer.

9. The method according to claim 8, wherein the calculation equation of the gas emission rate J at the surface of the cover layer is as follows:

$$J = \left[C_g(z, t) \times (v_g + v_w H_g) - \theta_g D_s \frac{\partial C_g(z, t)}{\partial t}\right]_{z=L};$$

where: $C_g$ (z,t) is the concentration of landfill gas in the cover layer; J is the gas emission rate at the surface of the cover layer.

10. The method according to claim 1, wherein further comprising:
   evaluating gas sealing performance of the existing soil cover layer, comprising:
   comparing and analyzing gas emission rates J obtained under different working conditions; and taking service time t of the cover layer as the x axis and the gas emission rates J at the surface of the cover layer as the y axis to draw a change curve of the gas emission rate J at the surface of the cover layer with time under the different working conditions; wherein after a period of action of rainfall and drying,
   if the gas emission rate J at the surface of the cover layer is less than the allowable gas emission standard limit value $J_L$ at the surface of the cover layer, the gas sealing performance of the existing soil cover layer is good, and the gas will not break through the cover layer;
   if the gas emission rate J at the surface of the cover layer is greater than the allowable gas emission standard limit value $J_L$ at the surface of the cover layer, the gas sealing performance of the existing soil cover layer is poor, increasing the thickness of the existing soil cover layer to reduce the gas emission rate J.

11. The method according to claim 1, wherein the calculation equation of the gas emission rate J at the surface of the cover layer is as follows:

$$J = \left[C_g(z, t) \times (v_g + v_w H_g) - \theta_g D_s \frac{\partial C_g(z, t)}{\partial t}\right]_{z=L}$$

wherein $$C_g(z,t) = Y^T[\exp(-\int_0^t H d\tau)T(0) + \exp(-\int_0^t H d\tau)\int_0^t \exp(\int_0^\tau H d\tau')G d\tau] + B;$$

where: $C_g$ (zt) is a landfill gas concentration in the cover layer; Y is an n×1-order matrix constituted of $$\frac{\psi_n(z)}{N_n^{1/2}};$$

$\psi_n(z)$ is a characteristic function and $N_n$ is a constant related to the orthogonality of the characteristic function $\psi_n(z)$; H is an n×r-order matrix constituted of $H_{nr}$, $H_{nr}$ is a time factor related to gas migration; T is an n×1-order matrix constituted of $T_n$, $T_n$ is the generalized integral transformation formula related to the gas concentration; G is an n×1-order matrix constituted of $G_n$, $G_n$ is an integral transformation; B is a function related to boundary conditions; $\theta_g$ is a volumetric gas content of the soil; $D_s$ is an effective diffusion coefficient of gas; $H_g$ is a Henry's coefficient; $v_w$ is a velocity of water flow; $v_g$ is an advective velocity of gas.

* * * * *